United States Patent
Jung

(10) Patent No.: US 11,818,415 B2
(45) Date of Patent: *Nov. 14, 2023

(54) REMOTE CONTROLLER FOR SETTING MODE ACCORDING TO STATE OF BROADCAST RECEIVING APPARATUS

(71) Applicant: SAMSUNG ELECTRONICS CO., LTD., Suwon-si (KR)

(72) Inventor: Young-mi Jung, Daegu (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/993,665

(22) Filed: Nov. 23, 2022

(65) Prior Publication Data

US 2023/0091906 A1    Mar. 23, 2023

Related U.S. Application Data

(63) Continuation of application No. 17/469,528, filed on Sep. 8, 2021, which is a continuation of application (Continued)

(30) Foreign Application Priority Data

Nov. 8, 2007    (KR) .................. 10-2007-0113885

(51) Int. Cl.
| | | |
|---|---|---|
| *H04N 5/63* | (2006.01) | |
| *H04N 21/422* | (2011.01) | |
| *H04N 21/41* | (2011.01) | |

(52) U.S. Cl.
CPC . *H04N 21/42204* (2013.01); *H04N 21/41265* (2020.08); *H04N 21/42208* (2013.01); *H04N 5/63* (2013.01); *H04N 21/42222* (2013.01)

(58) Field of Classification Search
CPC ....... H04N 21/42204; H04N 21/41265; H04N 21/42208; H04N 21/42222; H04N 5/63
(Continued)

(56) References Cited

U.S. PATENT DOCUMENTS

| 5,684,526 A | 11/1997 | Yoshinobu |
| 5,774,187 A | 6/1998 | Tsunoda |

(Continued)

FOREIGN PATENT DOCUMENTS

| JP | 10336758 A | 12/1998 |
| JP | 2001-268658 A | 9/2001 |

(Continued)

OTHER PUBLICATIONS

Communication dated Jan. 18, 2018, issued by the European Patent Office in counterpart European Application No. 13189212.7.
(Continued)

*Primary Examiner* — Trang U Tran
(74) *Attorney, Agent, or Firm* — Sughrue Mion, PLLC

(57) ABSTRACT

A remote control apparatus for setting a mode according to a state of a broadcast receiving apparatus is provided. The remote control apparatus sets operation modes based on information regarding a state of a broadcast receiving apparatus received from the broadcast receiving apparatus. The operation mode of the remote control apparatus is automatically set based on information regarding a state of a broadcast receiving apparatus, so less power is consumed in the remote control apparatus.

25 Claims, 4 Drawing Sheets

Related U.S. Application Data

No. 15/909,169, filed on Mar. 1, 2018, now Pat. No. 11,153,629, which is a continuation of application No. 14/630,815, filed on Feb. 25, 2015, now Pat. No. 9,942,507, which is a continuation of application No. 12/119,756, filed on May 13, 2008, now Pat. No. 8,982,284.

(58) Field of Classification Search
USPC .......................................................... 348/734
See application file for complete search history.

(56) References Cited

U.S. PATENT DOCUMENTS

| | | | |
|---|---|---|---|
| 5,978,923 | A | 11/1999 | Kou |
| 6,011,546 | A | 1/2000 | Bertram |
| 6,120,523 | A | 9/2000 | Crocker et al. |
| 6,346,891 | B1 * | 2/2002 | Feinleib ................. H04B 1/202 340/432 |
| 6,407,779 | B1 | 6/2002 | Herz |
| 6,784,805 | B2 | 8/2004 | Harris et al. |
| 7,009,528 | B2 | 3/2006 | Griep |
| 7,190,345 | B2 * | 3/2007 | Nashida ........... H04N 21/42224 348/14.05 |
| 7,757,105 | B2 | 7/2010 | Okazaki |
| 7,821,377 | B2 | 10/2010 | Arai et al. |
| 7,889,175 | B2 | 2/2011 | Kryze et al. |
| 8,578,429 | B2 | 11/2013 | Lim et al. |
| 8,583,951 | B2 * | 11/2013 | Kuno ..................... H04N 7/163 713/323 |
| 2004/0169590 | A1 | 9/2004 | Haughawout et al. |
| 2004/0181292 | A1 | 9/2004 | Ha et al. |
| 2005/0033887 | A1 | 2/2005 | Kim et al. |
| 2006/0158571 | A1 | 7/2006 | Tsunoda et al. |
| 2006/0221522 | A1 | 10/2006 | Furuta |
| 2006/0267726 | A1 | 11/2006 | Arai et al. |
| 2007/0054651 | A1 | 3/2007 | Farmer et al. |
| 2007/0130582 | A1 | 6/2007 | Chang et al. |
| 2007/0185968 | A1 | 8/2007 | White et al. |
| 2009/0303097 | A1 | 12/2009 | Reams et al. |

FOREIGN PATENT DOCUMENTS

| | | |
|---|---|---|
| JP | 2007-174031 A | 7/2007 |
| KR | 20-0141732 | 6/1997 |
| KR | 200141732 Y1 | 6/1997 |
| KR | 2000-0037655 A | 7/2000 |
| KR | 10-2002-0023022 A | 3/2002 |
| KR | 10-2002-0067008 A | 8/2002 |
| KR | 10-2003-0000580 A | 1/2003 |
| KR | 10-2005-0051714 A | 6/2005 |
| WO | 2007/023437 A2 | 3/2007 |

OTHER PUBLICATIONS

Communication dated Apr. 4, 2022 issued by the European Patent Office in EP Application No. 13189212.7.
Communication dated Dec. 10, 2015, issued by the European Patent Office in counterpart European Application No. 13189212.7.
Communication dated May 7, 2021, issued by the European Patent Office in counterpart European Application No. 20201366.0.
Communication dated Sep. 5, 2014 issued by the Korean Intellectual Property Office in counterpart Korean Patent Application No. 10-2014-0065124.
Communication from the European Patent Office dated May 27, 2014 in a counterpart European Application No. 13189212.7.
Communication from the European Patent Office dated May 9, 2017, in counterpart European Application No. 13189212.7.
Communication, dated Sep. 30, 2013, issued by the Korean Patent Office in counterpart Korean Application No. 10-2007-0113885.
Communication, Issued by the Korean Intellectual Property Office, dated Dec. 8, 2014, In counterpart Korean Application No. 10-2007-0113885.
Final Office Action dated Aug. 22, 2014 in prior U.S. Appl. No. 12/119,756.
Final Office Action dated Mar. 6, 2012 in prior U.S. Appl. No. 12/119,756.
Final Office Action dated Sep. 20, 2013 in prior U.S. Appl. No. 12/119,756.
Hitachi Ltd., et al., "HDMI Specification Version 1.3a", Internet Citation, Nov. 10, 2006 (Nov. 10, 2006), XP002476103, total 276 pages, Retrieved from the Internet: URL: http://www.hdmi.org/download/HDMISpecification13a.pdf.
Notice of Allowance issued in parent U.S. Appl. No. 14/630,815 dated Dec. 8, 2016.
Notice of Allowance issued in related U.S. Appl. No. 14/047,675 dated Oct. 10, 2014.
Notice of Allowance dated Nov. 7, 2014 in prior U.S. Appl. No. 12/119,756.
Notice of Preliminary Rejection, dated Sep. 30, 2013 from the Korean Patent Office in Korean Application No. 10-2007-0113885, along with an English translation thereof.
Office Action dated Feb. 25, 2014 in prior U.S. Appl. No. 12/119,756.
Office Action issued in parent U.S. Appl. No. 14/630,815 dated Feb. 1, 2016.
Office Action issued in parent U.S. Appl. No. 14/630,815 dated Jul. 31, 2015.
Office Action issued in parent U.S. Appl. No. 14/630,815 dated Jun. 16, 2016.
Office Action issued in parent U.S. Appl. No. 14/630,815 dated Mar. 30, 2017.
Office Action issued in related U.S. Appl. No. 14/047,675 dated Dec. 27, 2013.
Office Action issued in related U.S. Appl. No. 14/047,675 dated Jun. 17, 2014.
Office Action dated Mar. 4, 2013 in prior U.S. Appl. No. 12/119,756.
Office Action dated Sep. 15, 2011 in prior U.S. Appl. No. 12/119,756.
Search Report dated Jun. 21, 2010 from the European Patent Office in counterpart European Application No. 08157965.8.
Second Notice of Allowance issued in parent U.S. Appl. No. 14/630,815 dated Nov. 7, 2017.
Second Notice of Allowance issued in related U.S. Appl. No. 14/047,675 dated Feb. 18, 2015.
Office Action issued in related U.S. Appl. No. 15/909,169 dated Jan. 2, 2019.
Office Action issued in related U.S. Appl. No. 15/909,169 dated Jul. 1, 2019.
Notice of Allowance issued in related U.S. Appl. No. 15/909,169 dated Oct. 2, 2019.
Office Action issued in related U.S. Appl. No. 15/909,169 dated Feb. 24, 2020.
Office Action issued in related U.S. Appl. No. 15/909,169 dated Aug. 11, 2020.
Second Notice of Allowance issued in related U.S. Appl. No. 15/909,169 dated May 13, 2021.
Examination Report dated Apr. 14, 2023 issued by the European Patent Office for European Patent Application No. 20201366.0.
Communication dated Apr. 28, 2023 by the European Patent Office for European Patent Application No. 22207960.0.
Examination Report dated May 12, 2023 by the European Patent Office for European Patent Application No. 22207960.0.

* cited by examiner

REMOTE CONTROLLER FOR SETTING MODE ACCORDING TO STATE OF BROADCAST RECEIVING APPARATUS

CROSS-REFERENCE TO RELATED APPLICATIONS

This application is a continuation application of U.S. patent application Ser. No. 17/469,528 filed Sep. 8, 2021, which is a continuation application of U.S. patent application Ser. No. 15/909,169 filed Mar. 1, 2018, now U.S. Pat. No. 11,153,629, which is a continuation application of U.S. patent application Ser. No. 14/630,815 filed Feb. 25, 2015, now U.S. Pat. No. 9,942,507, which is a continuation application of U.S. patent application Ser. No. 12/119,756 filed May 13, 2008, now U.S. Pat. No. 8,982,284, which claims priority from Korean Patent Application No. 10-2007-0113885, filed on Nov. 8, 2007 in the Korean Intellectual Property Office, the disclosures of which are incorporated herein by reference in their entireties.

BACKGROUND OF THE INVENTION

1. Field of the Invention

Apparatuses consistent with the present invention relate to a remote controller, and more particularly, to a remote controller which receives a user command for controlling a broadcast receiving apparatus, and transmits the received command to the broadcast receiving apparatus.

2. Description of the Related Art

A remote controller is an electronic device used for the remote operation of a machine. The remote controller is widely used to manipulate a television (TV).

The remote controller transmits a command received from a user to a TV via infrared (IR) radiation. IR radiation is electromagnetic radiation of a wavelength shorter than that of microwaves. IR radiation cannot penetrate objects, and is inappropriate to transfer massive information.

To solve above drawbacks, a remote controller using radio frequency (RF) communication is provided. However, the type of remote controller has increase power consumption.

Therefore, a method is required, which causes a remote controller to consume less power.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a remote control apparatus which sets an operation mode according to information regarding a state of a broadcast receiving apparatus received from the broadcast receiving apparatus to reduce power consumption, and a method for setting a mode thereof.

The present invention also provides a broadcast receiving apparatus which transmits information regarding a state of the broadcast receiving apparatus to a remote control apparatus in order to set an operation mode of the remote control apparatus according to the information regarding the state of the broadcast receiving apparatus.

According to an exemplary aspect of the present invention, there is provided a remote control apparatus, comprising a communication module which is connected to a broadcast receiving apparatus for communication; a user input unit which receives a user command regarding the broadcast receiving apparatus; and a controller which transmits the user command input through the user input unit to the broadcast receiving apparatus through the communication module, and sets an operation mode according to information regarding a state of the broadcast receiving apparatus received from the broadcast receiving apparatus through the communication module.

If it is determined that the broadcast receiving apparatus is in a predetermined state, the controller may set the remote control apparatus to a mode to consume less power.

The predetermined state may represent that the broadcast receiving apparatus is turned off.

If it is determined that the broadcast receiving apparatus is in the predetermined state, the controller may set the remote control apparatus to a first mode in which power consumption is reduced, and if the user command is not input through the user input unit for a predetermined time, the controller may set the remote control apparatus to a second mode in which power consumption is reduced.

Less power may be consumed in the first mode than in the second mode.

If it is determined that the broadcast receiving apparatus is turned on, the controller may set the remote control apparatus to active mode.

The remote control apparatus may further comprise a display, wherein if it is determined that video information is received from the broadcast receiving apparatus through the communication module, the controller may activate the display, and display the received information on the display.

The video information may comprise at least one of: information stored in the broadcast receiving apparatus; information acquired by the broadcast receiving apparatus from an external source; information to inform a user of a predetermined condition; and information relating to states of devices adjacent to the broadcast receiving apparatus.

The user input unit may receive the user command by detecting at least one of a user manipulation of elements of the remote control apparatus, and the user moving the remote control apparatus.

According to another exemplary aspect of the present invention, there is provided a method for setting a mode of a remote control apparatus connected to a broadcast receiving apparatus for communication, the method comprising transmitting an input user command to the broadcast receiving apparatus; and setting an operation mode of the remote control apparatus according to information regarding a state of the broadcast receiving apparatus received from the broadcast receiving apparatus.

If it is determined that the broadcast receiving apparatus is in a predetermined state, the setting may set the remote control apparatus to a mode to consume less power.

The predetermined state may represent that the broadcast receiving apparatus is turned off.

If it is determined that the broadcast receiving apparatus is in the predetermined state, the setting may set the remote control apparatus to a first mode to consume less power, and if the user command is not input through the user input unit for a predetermined time, the setting may set the remote control apparatus to a second mode to consume less power.

Less power may be consumed in the first mode than in the second mode.

If it is determined that the broadcast receiving apparatus is turned on, the setting may set the remote control apparatus to an active mode.

The method may comprise activating a display if video information is received from the broadcast receiving apparatus; and displaying the received video information on the display.

The video information may comprise at least one of: information stored in the broadcast receiving apparatus; information acquired by the broadcast receiving apparatus from an external source; information to inform a user of a predetermined condition; and information relating to states of devices adjacent to the broadcast receiving apparatus.

The user command may be input by detecting at least one of a user manipulation of elements of the remote control apparatus, and the user moving the remote control apparatus.

According to another exemplary aspect of the present invention, there is provided a broadcast receiving apparatus which receives broadcast, and provides a user with the received broadcast, the apparatus comprising a communication module which is connected to a remote control apparatus for communication; and a controller which controls the broadcast receiving apparatus according to a user command input from the remote control apparatus through the communication module, and transmits information regarding a state of the broadcast receiving apparatus to the remote control apparatus through the communication module in order to set an operation mode of the remote control apparatus according to the information regarding a state of the broadcast receiving apparatus.

The state of the broadcast receiving apparatus may comprise at least one of a power off state and a power on state, and the operation mode of the remote control apparatus may comprise a mode to consume less power of the remote control apparatus.

The controller may transmit the user command input through an operating element of the broadcast receiving apparatus to the remote control apparatus through the communication module.

According to another exemplary aspect of the present invention, there is provided a method for controlling a broadcast receiving apparatus which receives broadcast, and provides a user with the received broadcast, the apparatus comprising controlling the broadcast receiving apparatus according to a user command input from a remote control apparatus; and transmitting information regarding a state of the broadcast receiving apparatus to the remote control apparatus in order to set an operation mode of the remote control apparatus according to the information regarding a state of the broadcast receiving apparatus.

The state of the broadcast receiving apparatus may comprise at least one of a power off state and a power on state, and the operation mode of the remote control apparatus may comprise a mode to consume less power of the remote control apparatus.

The method may further comprise transmitting the user command input through an operating element of the broadcast receiving apparatus to the remote control apparatus.

According to another exemplary aspect of the present invention, there is provided a broadcast receiving system, comprising a remote control apparatus which transmits an input user command; and a broadcast receiving apparatus which controls an operation according to the user command received from the remote control apparatus, and transmits information regarding a state thereof to the remote control apparatus, wherein the remote control apparatus sets an operation mode thereof according to the information received from the broadcast receiving apparatus.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
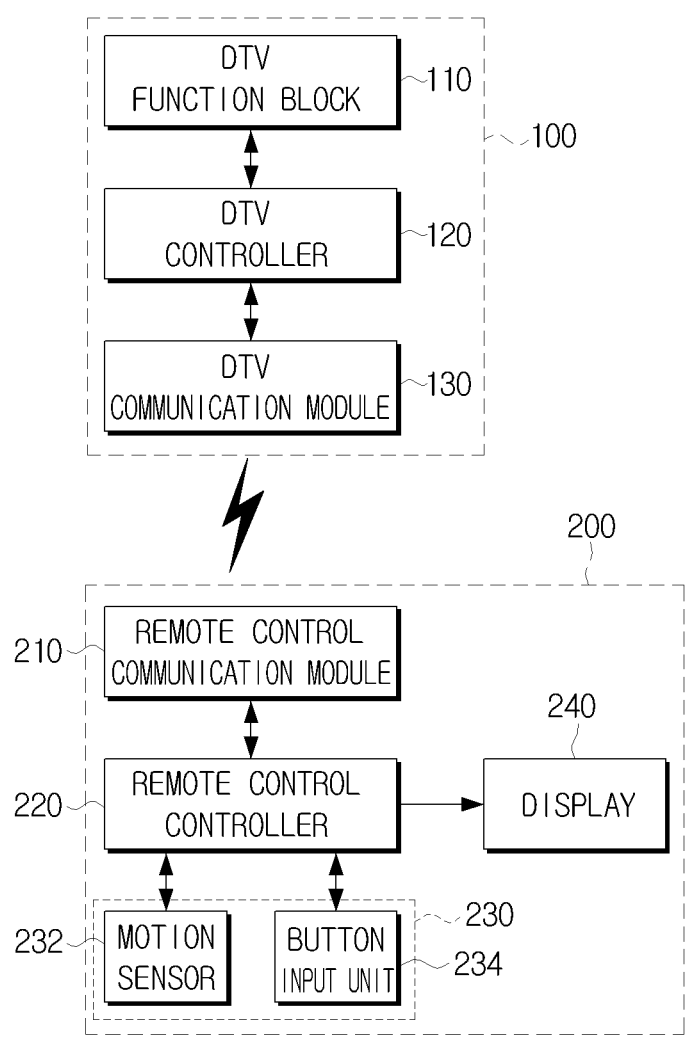
FIG. 1 is a view of illustrating an exemplary broadcast receiving system applicable to the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view of illustrating a broadcast receiving system applicable to the present invention. Referring to FIG. 1, a broadcast receiving system comprises a DTV 100 as a broadcast receiving apparatus and a remote controller 200.

The DTV 100 provides a user with broadcast received over wire or wirelessly, and the remote controller 200 receives user inputs regarding the DTV 100. The DTV 100 and the remote controller 200 are communicably linked to each via radio frequency (RF) communication. The remote controller 200 may transmit the input user command to the DTV 100.

The DTV 100 comprises a DTV function block 110, a DTV controller 120, and a DTV communication module 130 as illustrated in FIG. 1.

The DTV function block 110 performs basic functions of the DTV 100. That is, the DTV function block 110 receives a digital broadcast signal, demodulates the received digital broadcast signal, decodes the demodulated digital broadcast signal, processes the decoded digital broadcast signal, and outputs the processed digital broadcast signal to provide a user with digital broadcast.

The DTV communication module 130 is communicably linked to the remote controller 200 for RF communication.

The DTV controller 120 controls the operation of the DTV function block 110 according to a user command which is received from the remote controller 200 through the DTV communication module 130.

The DTV controller 120 transmits information regarding a state of the operation of the DTV 100 to the remote controller 200 through the DTV communication module 130. The operation state of the DTV 100 may include power on and off states.

The remote controller 200 comprises a remote control communication module 210, a remote control controller 220, a user input unit 230, and a display 240.

The remote control communication module 210 is communicably linked to the DTV 100 for RF communication.

The user input unit 230 comprises a motion sensor 232 and a button input unit 234 to receive a user command.

The motion sensor 232 senses movement of the remote controller 200 according to a user manipulation, and transmits the sensed result to the remote control controller 220. In particular, a user moves the remote controller 200 up or down, or to the right or left, or rotates the remote controller 200 while holding the remote controller 200. The motion sensor 232 senses a direction and degree of movement of the remote controller 200, and transmits the sensed result to the remote control controller 220.

The movement of the remote controller 200, caused by a user, may be processed as a user command. For example, if a user moves the remote controller 200 up or down, or to the right or left, this may be input as a command directing to move a curser or a pointer on the DTV 100 up or down, or to the right or left.

The motion sensor 232 may be embodied as a gyro sensor to perform the above functions.

The button input unit 234 may comprise a power button, a volume button, and a selection button, and a user may input a desired command by pressing a corresponding button.

The remote control controller 220 transmits a user command input through the user input unit 230 to the DTV 100 through the remote control communication module 210.

The remote control controller 220 sets an operation mode of the remote controller 200 based on a DTV operation state and a user command input state representing that a user has not input the remote controller 200 for a predetermined period of time.

The remote control controller 220 sets the remote controller to an active mode, an idle mode, or a sleep mode according to the above two states, which will be explained below in detail.

Figure 2:
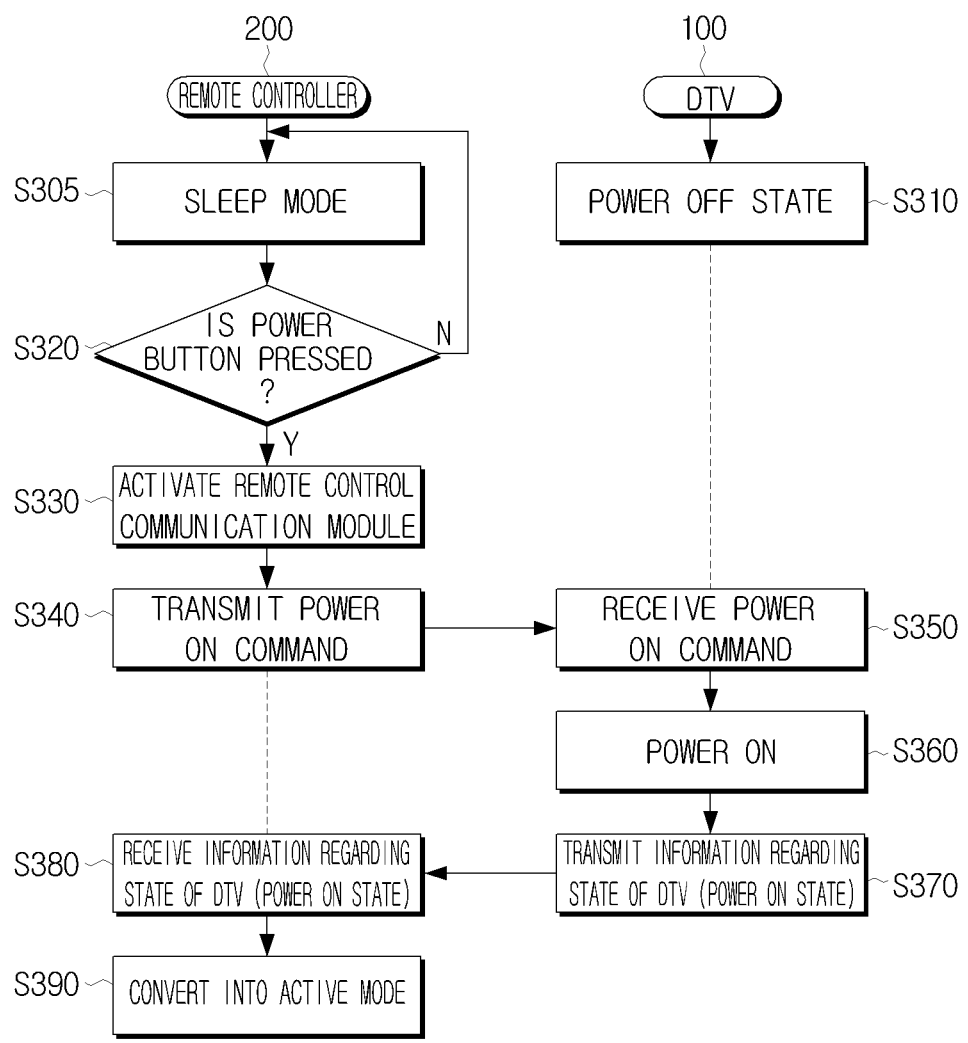
FIG. 2 is a view illustrating the operation between a remote controller and a digital television (DTV) when a user desires to turn on the DTV using the remote controller according an exemplary embodiment of the present invention.

FIG. 2 is a view illustrating the operation between the remote controller 200 and the DTV 100 when a user desires to turn on the DTV using the remote controller 200.

The remote controller 200 is in the sleep mode (S305), and the DTV 100 is in a power off state (S310).

In the sleep mode, the DTV 100 is placed in a state of waiting for a power on command and the remote controller 200 only operates to sense a user pressing on the power button.

Even when the DTV 100 is turned off, the DTV controller 120 and the DTV communication module 130 are in an activation state to receive a user command transmitted from the remote controller 200.

If a user presses the power button on the button input unit 234 (S320-Y), the remote control controller 220 senses that the power button is pressed, and activates the remote control communication module 210 (S330). The remote control controller 220 transmits a power on command to the DTV 100 through the remote control communication module 210 (S340).

The DTV controller 120 of the DTV 100 receives the power on command transmitted in operation S340 through the DTV communication module 130 (S350). The DTV controller 120 activates the DTV function block 110 to turn on the DTV 100 (S360).

The DTV controller 120 transmits information regarding a state of the DTV 100, that is a power on state, to the remote controller 200 through the DTV communication module 130 (S370).

The remote control controller 220 receives the information regarding the state of the DTV 100 transmitted in operation S370 through the remote control communication module 210 (S380).

The remote control controller 220 determines the power on state of the DTV 100 from the information received from the DTV 100, and activates the display 240, the motion sensor 232, the button input unit 234, and all the buttons of the button input unit 234 excluding the power button to change the remote controller 200 to active mode (S390).

As the power button has already been activated, activation of the power button is excluded in operation S390.

When operation S390 is finished, all the elements of the remote controller 200 are activated, which represents that the remote controller 200 is set to the active mode.

Figure 3:
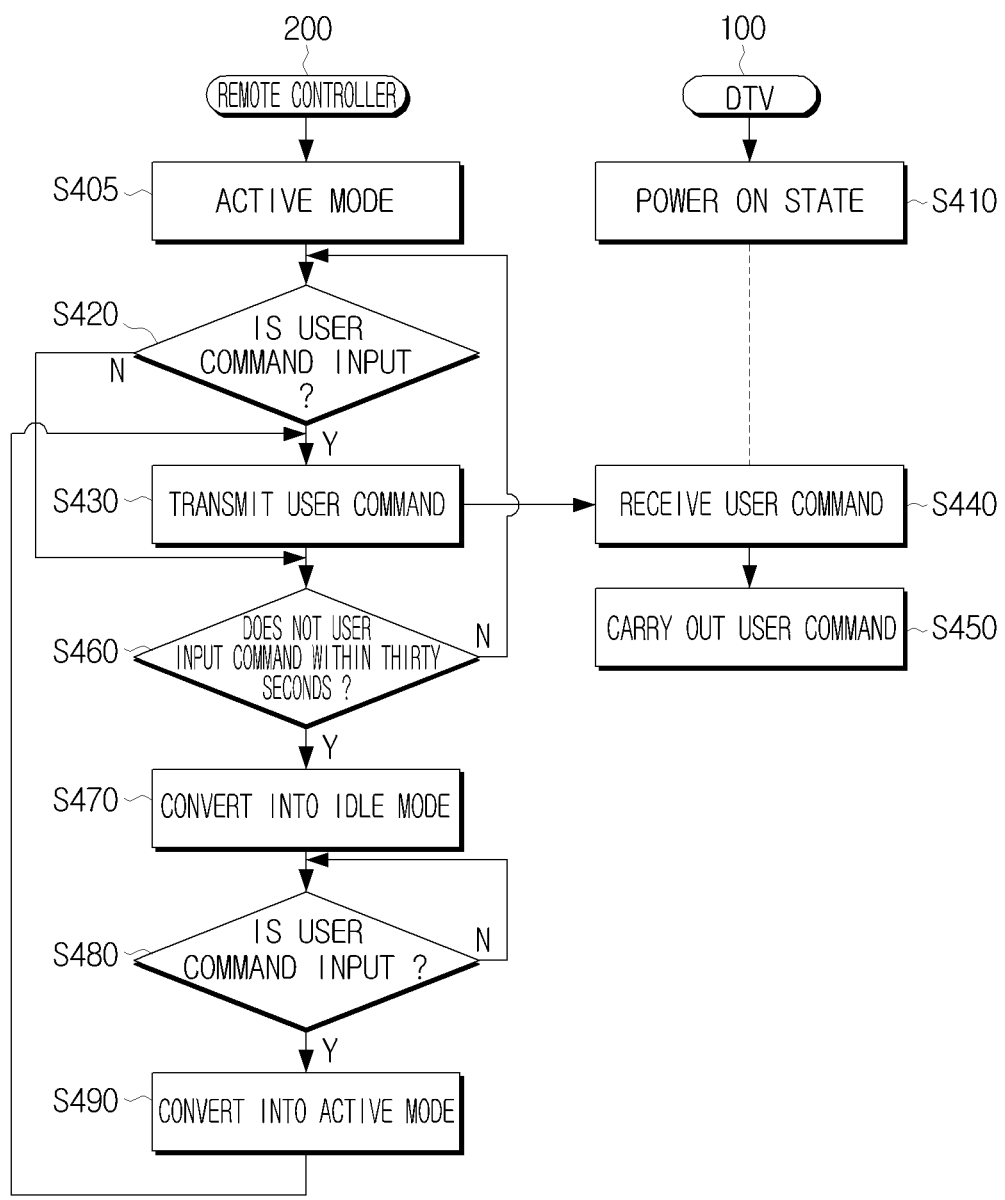
FIG. 3 is a view illustrating the operation between a remote controller and a DTV after the DTV is turned on according an exemplary embodiment of the present invention.

Hereinbelow, the operation between the remote controller 200 and the DTV 100 after the DTV 110 is turned on will be explained in detail with reference to FIG. 3.

The remote controller 200 is in the active mode (S405), and the DTV 100 is in a power on state (S410).

If a user inputs a command using the user input unit 230 (S420-Y), the remote control controller 220 senses the input user command, and transmits the sensed user command to the DTV 100 through the remote control communication module 210 (S430).

The input of the user command in operation S420 is determined according to: i) whether the motion sensor 232 senses movement of the remote controller 200; or ii) according to whether a user presses a button of the button input unit 234.

The DTV controller 120 of the DTV 100 receives the user command transmitted in operation S430 through the DTV communication module 130 (S440). The DTV controller 120 controls the DTV function block 110 to carry out the received user command (S450).

If a user does not input a command within thirty seconds (S420-N and S460-Y), the remote control controller 220 sets the remote controller 200 to the idle mode (S470).

In the idle mode, the display 240 is set to an inactivation state, and the remote communication module 210, the motion sensor 232, and the button input unit 234 are maintained in an activation state.

Accordingly, in operation S470, the remote control controller 220 sets the display 240 to an inactivation state.

If a user inputs a command using the user input unit 230 while the remote controller 200 is in the idle mode (S480-Y), the remote control controller 220 sets the remote controller 200 to the active mode (S490).

Accordingly, in operation S490, the remote control controller 220 sets the display inactivated by operation S470 to an activation state. After performing operation S490, the operation returns to operation S430.

Figure 4:
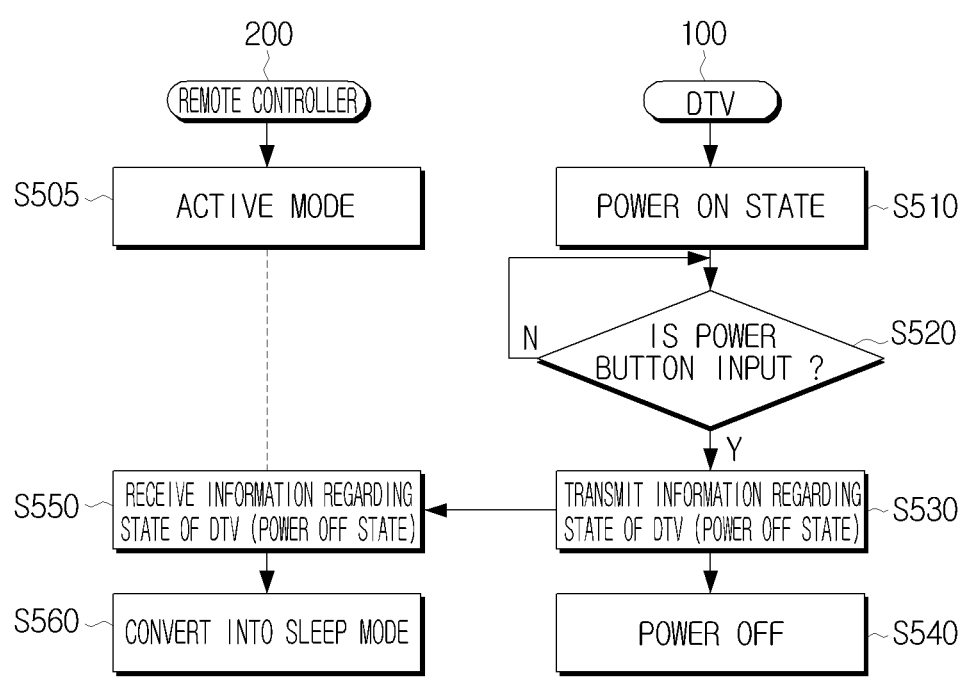
FIG. 4 is a view illustrating the operation between a remote controller and a DTV when a use desires to turn off the DTV using a power button provided to the DTV according an exemplary embodiment of the present invention.

FIG. 4 is a view illustrating the operation between the remote controller 200 and the DTV 100 when a use desires to turn off the DTV 1100 using a power button of the DTV 100 instead of the remote controller 200.

The remote controller 200 is in the active mode (S505), and the DTV 100 is in a power on state (S510).

If a user presses a power button of the DTV 100 (S520-Y), the DTV controller 120 senses that the power button is pressed, and transmits information regarding a state of the DTV 100, that is a power off state, to the remote controller 200 through the DTV communication module 130 (S530). The DTV controller 120 inactivates the DTV function block 110 of the DTV 100 to turn off the DTV 100 (S540).

The remote control controller 220 receives the information regarding the state of the DTV 100 transmitted in operation S530 through the remote control communication module 210 (S550).

The remote control controller 200 perceives that the DTV 100 is turned off based on the received information, and inactivates the remote control communication module 210, the display 240, the motion sensor 232, and all the buttons of the button input unit 234 excluding the power button to set the remote controller 200 to the sleep mode (S560). That is, in operation S560, only the function to sense whether the power button is input is activated, while the rest of the functions are inactivated.

FIG. 4 describes the operation between the remote controller 200 and the DTV 100 when a user desires to turn off the DTV 100 using the power button of the DTV 100. However, the user may use a power button of the remote controller 200 instead of the power button of the DTV 100 to turn off the DTV 100.

The remote control controller 220 senses that the user inputs the power button of the remote controller 200, and transmits a power off command to the DTV 100 through the remote control communication module 210.

The DTV controller 120 receives the power off command through the DTV communication module 130, and inactivates the DTV function block 110 to turn off the DTV 100.

The DTV controller 120 transmits information regarding a state of the DTV 100, that is a power off state to the remote controller 220 through the DTV communication module 130. The remote control controller 220 receives the information regarding the power off state of the DTV 100 through the remote control communication module 210.

The remote control controller 220 perceives the power off state of the DTV 100 based on the received information, and thus sets the remote controller 200 to the sleep mode.

According to the exemplary embodiments of the present invention, when a user presses the power button of the DTV 100 to turn off the DTV 100, the remote controller 200 is set to the sleep mode. However, this is merely an exemplary embodiment of the present invention for a convenient description. Alternatively, when the user presses the power button of the DTV 100 to turn on the DTV 100, it is possible for the remote controller 200 to be set to the active mode.

According to the exemplary embodiments of the present invention, the user input unit 230 includes the motion sensor 232 to sense the movement of the remote controller 200 and the button input unit 234 to receive a user command. However, this is merely an exemplary embodiment of the present invention. Accordingly, the user input unit 230 may employ other devices such as a touch screen, a joystick, and a jog wheel, and a user may input a user command using such devices.

While the state of the DTV 100 is classified as a power on and power off states according to the exemplary embodiments of the present invention, this is merely an exemplary embodiment of the present invention. Accordingly, other states of the DTV 100 are applicable to the present invention. For example, when the DTV 100 is in idle state, or is connected to external apparatuses, the remote controller 200 may be set to a predetermined mode.

The operation mode of the remote controller 200 is classified as the active mode, the idle mode, and the sleep mode in the exemplary embodiment of the present invention. As this is merely an exemplary embodiment of the present invention, the operation mode of the remote controller 200 may be classified as other modes.

Since the idle mode and sleep mode save electrical consumption, any low power consuming modes for the remote controller 200 may be applicable to replace the idle or sleep mode of the present invention. That is, the other modes with different names of descriptions may be applied to the present invention.

The exemplary embodiments of the present invention also do not limit that the remote controller 200 should be set to a lower power consuming mode upon determining the DTV to be in a predetermined state. Therefore, other modes are applicable to the remote controller 200 according to the exemplary embodiment of the present invention.

For example, if it is determined that the DTV 100 transmits video information to the remote controller 200, the remote controller 200 may be set to a mode for activating the display 240, and display the received video information on the display 240.

The video information may be information stored in the DTV 100, information acquired from an external source such as external apparatus or the Internet, information informing a user of a predetermined state, or information regarding a state of devices adjacent to the DTV 100.

For example, the information informing a user of a predetermined state may include a notification that a predetermined alarm time has expired, and the information regarding a state of devices adjacent to the DTV 100 may include a notification that a short message service (SMS) is received in a mobile phone.

While the DTV 100 is connected to the remote controller 200 for the RF communication in the exemplary embodiment of the present invention described above, this is merely an exemplary embodiment of the present invention. The DTV 100 may be connected to the remote controller 200 for other communication.

While the DTV 100 according to the exemplary embodiment of the present invention is described as a broadcast receiving apparatus, other broadcast receiving apparatuses may be applied to the present invention, such as other electric devices.

As described above, according to the present invention, an operation mode of a remote control apparatus can be set automatically according to information regarding a state of a broadcast receiving apparatus. Accordingly, less power is consumed in the remote control apparatus than in a conventional remote control apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic system comprising, a display apparatus; and
a remote control apparatus comprising:
a first communicator;
a user input unit comprising a plurality of buttons including a button for controlling the display apparatus; and a first controller configured to:
in response to the button being pressed, control the first communicator to transmit a first signal corresponding to the button to the display apparatus;
receive, through the first communicator from the display apparatus, a second signal as a response with respect to the first signal; and
based on the second signal, control an operating state of at least one electrical component of the remote control apparatus to change from a first state to a second state,
wherein the display apparatus comprises:
a second communicator; and
a second controller configured to, in response to receiving the first signal through the second communicator from the remote control apparatus, control the second communicator to transmit the second signal to the remote control apparatus, and
wherein the at least one electrical component consumes less power in the first state than in the second state.

2. The electronic system of claim 1, wherein the button is a power button for controlling a power of the display apparatus.

3. The electronic system of claim 1, wherein the second signal is a response signal for the first signal.

4. The electronic system of claim 1, wherein the second state is an active state and the first state is a sleep state.

5. The electronic system of claim 4, wherein the at least one electrical component comprises a motion sensor, and
wherein the operating state of the motion sensor is changed based on the second signal.

6. The electronic system of claim 5, wherein the second controller of the display apparatus is further configured to, in response to receiving the first signal through the second communicator from the remote control apparatus, control the second communicator to transmit the second signal to the remote control apparatus based on the operating state of the display apparatus.

7. The electronic system of claim 6, wherein the second signal indicates a power status of the display apparatus.

8. The electronic system of claim 6, wherein, in response to receiving a third signal through the first communicator from the display apparatus, the first controller of the remote control apparatus is further configured to change the motion sensor in the active state to the sleep state.

9. The electronic system of claim 8, wherein the second controller of the display apparatus is further configured to transmit the third signal to the remote control apparatus in response to pressing a specific button of the display apparatus.

10. The electronic system of claim 1, wherein the first controller is further configured to activate the first communicator in response to the button being pressed.

11. An electronic system comprising:
a display apparatus; and
a remote control apparatus comprising:
a first communicator;
a user input unit comprising a plurality of buttons for controlling the display apparatus; and
a first controller configured to:
in response to a user input with respect to the remote control apparatus, control the first communicator to transmit a first signal;
receive, through the first communicator from the display apparatus, a second signal as a response with respect to the first signal; and
based on the second signal, control an operating state of at least one electrical component of the remote control apparatus to change from a first state to a second state,
wherein the display apparatus comprises:
a second communicator;
a second controller configured to:
in response to receiving the first signal through the second communicator from the remote control apparatus, control the second communicator to transmit the second signal to the remote control apparatus, and
wherein the at least one electrical component consumes less power in the first state than in the second state.

12. The electronic system of claim 11, wherein the first controller of the remote control apparatus is further configured to, in response to a button among the plurality of buttons being pressed, control the first communicator to transmit the first signal corresponding to the button to the display apparatus.

13. The electronic system of claim 11, wherein the second signal is a response signal for the first signal.

14. The electronic system of claim 11, wherein the second state is an active state and the first state is a sleep state.

15. The electronic system of claim 14, wherein the at least one electrical component comprises a motion sensor, and
wherein the operating state of the motion sensor is changed based on the second signal.

16. The electronic system of claim 15, wherein the second controller of the display apparatus is further configured to, in response to receiving the first signal through the second communicator from the remote control apparatus, control the second communicator to transmit the second signal to the remote control apparatus based on the operating state of the display apparatus.

17. The electronic system of claim 16, wherein the second signal indicates a power status of the display apparatus.

18. The electronic system of claim 16, wherein, in response to receiving a third signal through the first communicator from the display apparatus, the first controller of the remote control apparatus is further configured to change the motion sensor in the active state to the sleep state.

19. The electronic system of claim 18, wherein the second controller of the display apparatus is further configured to transmit the third signal to the remote control apparatus in response to pressing a specific button of the display apparatus.

20. An electronic system comprising:
a display apparatus comprising:
a first communicator; and
a first controller; and
a remote control apparatus comprising:
a second communicator;
a motion sensor;
a user input unit comprising a plurality of buttons including a button for controlling the display apparatus; and
a second controller configured to:
control the motion sensor to operate in a sleep state, and
in response to the button being pressed, based on a first signal received from the display apparatus through the second communicator, determine to switch the motion sensor from the sleep state to an active state.

21. The electronic system of claim 20, wherein the button is a power button for controlling a power of the display apparatus.

22. The electronic system of claim 20, wherein power consumption is greater in the active state than in the sleep state.

23. The electronic system of claim 20, wherein the first signal indicates a power status of the display apparatus.

24. The electronic system of claim 20, wherein, in response to receiving a second signal through the second communicator from the display apparatus, the second controller of the remote control apparatus is further configured to change the motion sensor in the active state to the sleep state.

25. The electronic system of claim 24, wherein the first controller of the display apparatus is further configured to transmit the second signal to the remote control apparatus in response to pressing a specific button of the display apparatus.

* * * * *

UNITED STATES PATENT AND TRADEMARK OFFICE
CERTIFICATE OF CORRECTION

| | | |
|---|---|---|
| PATENT NO. | : 11,818,415 B2 | Page 1 of 1 |
| APPLICATION NO. | : 17/993665 | |
| DATED | : November 14, 2023 | |
| INVENTOR(S) | : Young-mi Jung | |

It is certified that error appears in the above-identified patent and that said Letters Patent is hereby corrected as shown below:

In the Claims

In Claim 1, at Column 8, Line 64, please further indent "a first communicator;" so that Line 64 and Line 65 are indented to the same degree.

Signed and Sealed this
Twenty-sixth Day of December, 2023

Katherine Kelly Vidal
*Director of the United States Patent and Trademark Office*